United States Patent
Requena (10) Patent No.: US 6,904,035 B2
(45) Date of Patent: Jun. 7, 2005

(54) MOBILE SYSTEM, TERMINAL AND INTERFACE, AS WELL AS METHODS FOR PROVIDING BACKWARD COMPATIBILITY TO FIRST AND SECOND GENERATION MOBILE SYSTEMS

(75) Inventor: Jose Costa Requena, Helsinki (FI)

(73) Assignee: Nokia Corporation, Espoo (FI)

( * ) Notice: Subject to any disclaimer, the term of this patent is extended or adjusted under 35 U.S.C. 154(b) by 550 days.

(21) Appl. No.: 09/991,540

(22) Filed: Nov. 14, 2001

(65) Prior Publication Data

US 2002/0141358 A1 Oct. 3, 2002

Related U.S. Application Data (60) Provisional application No. 60/253,890, filed on Nov. 29, 2000.

(51) Int. Cl.$^7$ ............................. H04J 3/24; H04L 12/66; H04Q 7/00
(52) U.S. Cl. ..................... 370/338; 370/349; 370/352; 370/401; 370/463; 370/467; 370/469; 455/432.2; 455/435.1; 709/227
(58) Field of Search ................................ 370/328, 329, 370/338, 349, 352, 353, 355, 389, 392, 401, 463, 465, 466, 467, 469; 455/422.1, 432.1, 432.2, 435.1, 445, 450; 709/227, 228, 230, 238, 249

(56) References Cited

U.S. PATENT DOCUMENTS

| | | | |
|---|---|---|---|
| 6,304,566 B1 | 10/2001 | Schessel | |
| 6,738,390 B1 * | 5/2004 | Xu et al. | 370/467 |
| 6,757,266 B1 * | 6/2004 | Hundscheidt | 370/328 |
| 2002/0075881 A1 * | 6/2002 | Yoakum et al. | 370/410 |

FOREIGN PATENT DOCUMENTS

| | | |
|---|---|---|
| EP | 0738091 | 10/1996 |
| WO | 9826621 | 6/1998 |
| WO | 0119093 | 3/2001 |

OTHER PUBLICATIONS

IETF RFC 2327 "SDP: Session Description Protocol", M. Handley et al, Apr. 1998.

"IP Telephone Gateways", G. Camarillo, Master's Thesis in Teleinformatics, Stockhold Nov. 2, 1998.

ITU-T H. 323 (Feb. 1998), Series H : Audiovisual and Multimedia Systems; Infrastructure of audiovisual services—Systems and terminal equipment for audiovisual services; Packet-based multimedia communications systems.

IETF FRC 2543bis SIP—Session Initiation Protocol, Handley et al, Aug. 6, 2000.

(Continued)

Primary Examiner—Alpus H. Hsu (57) ABSTRACT

Application-layer signaling of a packet data network, such as the Session Initiation Protocol (SIP), is used to communicate with an interworking interface between the packet data network and a circuit-switched network, particularly a public land mobile network (PLMN), wherein the interface converts the application-layer signaling of the packet data network to a control protocol utilized in the PLMN, wherein a private user identification is carried, for example, by means of a Session Description Protocol (SDP) within the application-layer signaling between the packet data network terminal and the interface, and wherein standardization of lower layers of the packet data network protocol stack is not required beyond that which is already defined. The interface between the packet data network and the circuit-switched network provides the private user identification to the circuit-switched network in the manner in which the circuit-switched network is accustomed.

20 Claims, 7 Drawing Sheets

OTHER PUBLICATIONS

3GPP TS 31.102 v3.3.00(Oct. 2000), 3rd Generation Partnership Project; Technical Specification Group Terminals; Characteristics of the USIM Application (Release 1999).

3G TS 22.129 3.2.0 (Dec. 1999); 3rd Generation Partnership Project; Technical Specification Group Services and System Aspects; Service Aspects; Handover Requirements Between UMTS and GSM or other Radio Systems (3G TS 22.129 v3.2.0).

3G TS 23.923 v3.0.0 (May 2000) ; 3rd Generation Partnership Project; Technical Specification Group Services and System Aspects; Combined GSM and Mobile IP Mobility Handling in UMTS IP CN (3G TR 23.923 v3.0.0).

"Signaling Protocol Architecture for a Digital Mobile Communications Network", A. Nakajima et al, *Electronics and Communications in Japan* Pt. 1: Communications, Jun. 1991, pp. 80–96.

TS 26.112 v1.1.0 (Jun. 1999) ; 3rd GenerationaPartnership Project; Technical Specification Group (TSG) Codec Working Group; Codec(s) for Circuit Switched Multimedia Telephone Service Call Set–up Requirements.

ITU–T H.223 (Mar. 1996) , Series H: Transmission of Non–Telephone Signals; Infrastruture of Audiovisual Services—Transmission multiplexing and Synchronization; Multiplexing Protocol for Low Bit Rate Multimedia Communication.

ITU–T H.324 (Feb. 1998) , Series H: Audiovisual and Multimedia Systems; Infrastruction of Audiovisual Services—Systems and Terminal Equipment for Audiovisual Services; Teminal for Low Bit–Rate Multimedia Communication.

ITU–T Q.931 (May 1998) , Series Q: Switching and Signalling, Digital Subscriber Signalling System No. 1—Network Layer; ISDN User–Network Interface Layer 3 Specification for Basic Call Control.

3GPP TS 24,008 v3.5.0 (Sep. 2000) ; 3rd GenerationlPartnership Project; Technical Specification Group Core Network; Mobile Radio Internace Layer 3 Specification; Core Network Protocols—Stage 3 (Release 1999).

ETSI TS 100 940 v7.10.0 (Dec. 2000) ; Digital Cellular Telecommunications System (Phase 2+) ; Mobile Radio Interface Layer 3 Specification (3GPP TS 04.08 version 7/10/0 Release 1998).

Signaling Protocol Architecture for a Digital Mobile Communications Network, A. Nakajima et al, *Electronics and Communications in Japan*, Part 1: Communications, vol. 74, No. 6, Jun. 1991, New York.

"3rd Generation Partnership Project: Technical Specification Group Services and System Aspects; Architecture Principles for Release 2000 (Release 2000)" 3G TR 23.821 V1.0.1, (Jul. 2000) pp. 1–62, XP002175634.

"Media Gateway Control Protocol and Voice Over IP Gateways" by L–P Anquetil et al; Alcatel Telecommunications Review, No. 2, 1999, pp. 151–157, XP000830045.

* cited by examiner

MOBILE SYSTEM, TERMINAL AND INTERFACE, AS WELL AS METHODS FOR PROVIDING BACKWARD COMPATIBILITY TO FIRST AND SECOND GENERATION MOBILE SYSTEMS

CROSS-REFERENCE TO RELATED APPLICATION

Priority is claimed under 35 USC § 119 to U.S. Provisional Application Ser. No. 60/253,890, Nov. 27, 2000.

BACKGROUND OF THE INVENTION

1. Technical Field

This invention relates to third generation mobile telecommunications and, more particularly, to backward compatibility thereof with previous generation mobile telecommunication systems.

2. Discussion of Related Art

The new Third Generation Partnership Project involves the provision of higher data rates and a wide range of telecommunications services, including support for multimedia. It is to be based on the Global System for Mobile communication (GSM) with some major modifications, especially in the radio interface. The third generation network is supposed to support both circuit-switched and packet-switched services. The circuit-switched technology will be based on the current GSM circuit-switched technology, and the packet-switched technology on General Packet Radio Service (GPRS), which is a new packet service for GSM.

The third generation architecture should support mobility management in a general manner. However, there is presently no way to interoperate the planned third generation system with the older generations of mobile systems without making an extensive standardization effort in order to make the new system interoperable with the old systems. For instance, there is a problem to be solved in providing user mobility for the third generation mobile units, which achieve mobility both in the new third generation infrastructure and while at the same time utilizing the earlier generation infrastructure. One solution would be to standardize a signaling methodology that would signal a user identification to the older networks in a way that could be interpreted properly. However, what is needed is a solution that does not need a standardization effort.

DISCLOSURE OF INVENTION

An object of the present invention is to provide interoperability between mobile packet data networks and mobile circuit switched networks using an application layer control protocol.

Another object of the present invention is to provide roaming capability using the Session Initiation Protocol (SIP) as the signalling for call control between mobile packet data networks and mobile circuit-switched networks.

According to the first aspect of the present invention, a method comprises the steps of receiving signaling provided by an application-layer control protocol from a terminal of a packet data network at an interface between the packet data network and a circuit-switched network, and converting the signaling from the terminal at the interface, for providing signaling in a protocol used in the circuit-switched network for enabling the terminal to access one or more services of the circuit-switched network.

According to a second aspect of the invention, a method comprises the steps of providing signaling according to an application-layer protocol from a terminal of a packet data network to an interface between the packet data network and a circuit-switched network, wherein the interface is for converting the signaling from the terminal for providing signaling in a protocol used in the circuit-switched network for enabling the terminal to access one or more services of the circuit-switched network, and receiving signaling from the interface according to the application-layer control protocol at the terminal of the packet data network indicative of a communication setup between the terminal and the packet data network and said one or more services of the circuit-switched network.

According to a third aspect of the invention, an interface comprises means for converting signaling provided by an application-layer control protocol from a terminal of a packet data network to a protocol used in a circuit-switched network for enabling the terminal to access one or more services of the circuit-switched network; and means for converting signaling provided by the circuit-switched network in the protocol used in the circuit-switched network to signaling for the application-layer control protocol used in the terminal of the packet data network for said enabling the terminal to access one or more services of the circuit-switched network.

According to a fourth aspect of the present invention, a terminal of a packet data network comprises transmitting means for providing signaling according to an application-layer protocol of the packet data network to an interface between the packet data network and a circuit-switched network, wherein the interface is for converting the signaling from the transmitting means for providing signaling in a protocol used in the circuit-switched network for enabling the terminal of the packet data network to access one or more services of the circuit-switched network; and receiving means for receiving signaling from the interface according to the application-layer control protocol of the packet data network indicative of a communication setup between the terminal and the switched network for accessing said one or more services of the circuit-switched network.

In further accord with the first, second, third and fourth aspects of the invention, the signaling from the packet data network is indicative of a private user identification of the terminal for enabling access to a roaming service available in the circuit-switched network comprising, at least in part, a public land mobile network (PLMN).

In accord with the first, second, third and fourth aspects of the invention, the application-layer control protocol is a session initiation protocol (SIP) and the circuit-switched network comprises, at least in part, a public land mobile network (PLMN).

In still further accord with the first, second, third and fourth aspects of the invention, a session description protocol (SDP) is provided within the SIP to indicate a private user identification of the terminal for enabling access to a roaming service of the PLMN for use by the terminal of the packet data network.

Further still in accordance with the first, second, third and fourth aspects of the invention, a session description protocol (SDP) is provided within the application-layer control protocol to indicate a private user identification of the terminal for enabling access to a roaming service available in the circuit-switched network comprising, at least in part, a public land mobile network (PLMN) for use by the terminal of the packet data network.

The basic idea of the present invention is to allow backward interoperability by placing the required user information within an application-level control protocol such as within an SIP payload. In that case, the User Agent can for instance insert e.g. the IMSI (International Mobile Subscriber Identity) and MSISDN (Mobile Station ISDN number) in the initial registration. The private information can be part of the session attribute headers within e.g. a Session Description Protocol (SDP) part of the SIP registration. In this way the packet can be completely encrypted end-to-end and there is no need for any effort to standardize any new specific header for this purpose.

These and other objects, features and advantages of the present invention will become more apparent in light of the detailed description of a best mode embodiment thereof, as illustrated in the accompanying drawings.

BEST MODE FOR CARRYING OUT THE INVENTION

Figure 1:
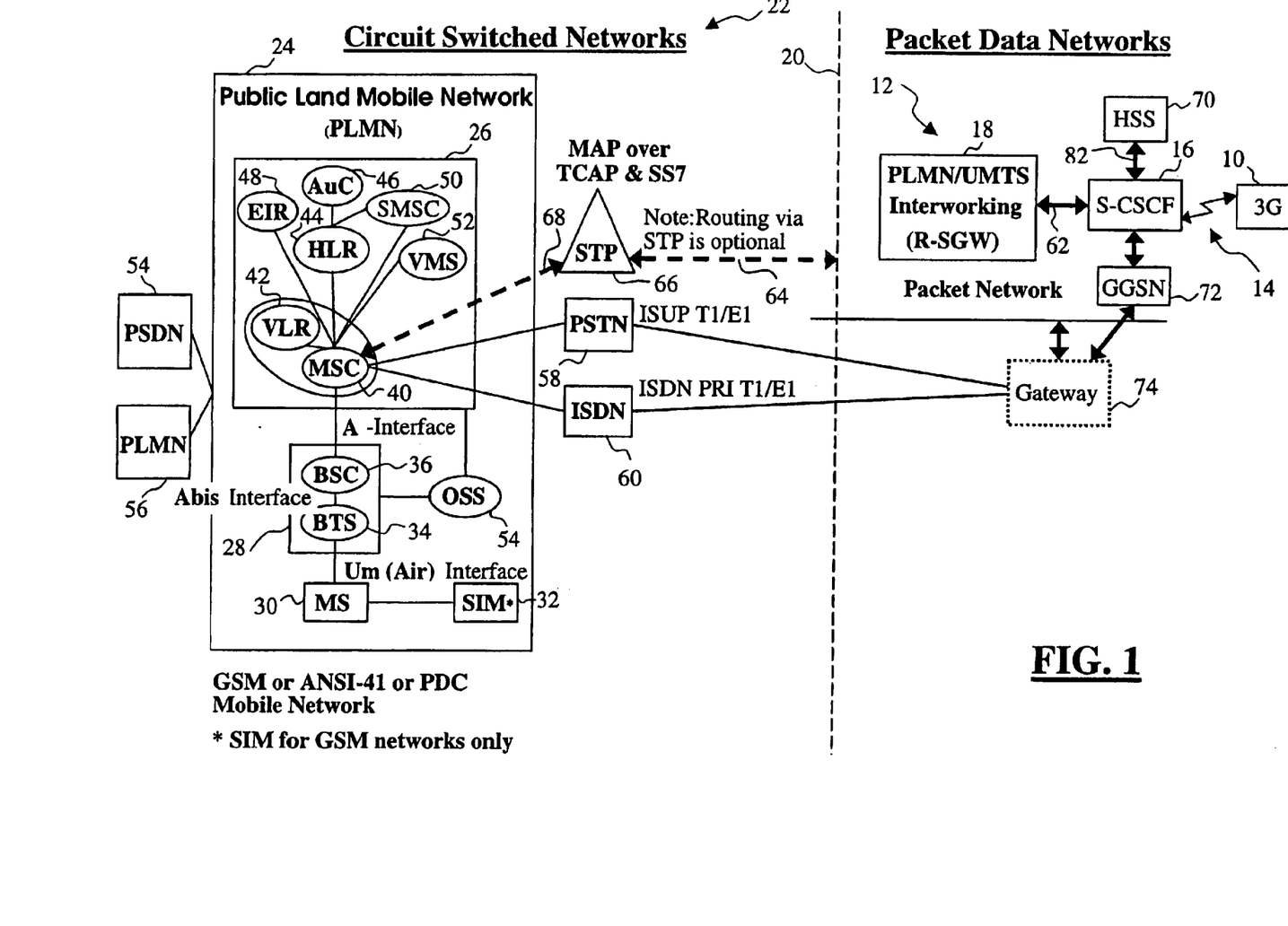
FIG. 1 shows circuit-switched networks interfaced to packet data networks by means of an embodiment of the inventive interface by means of which a mobile terminal in the packet data network can access services of a public land mobile network without requiring any protocol standardization.

FIG. 1 shows a third generation terminal 10 in a packet data network 12, which may for instance be of the GPRS type network architecture or the UMTS (Universal Mobile Telecommunication System) packet network architecture. The terminal 10 communicates over a wireless link 14 with a base station or a Node-B which may include a control means such as a Call Station Control Function (CSCF) 16. The CSCF is part of the Call Processing Server (CPS) and performs all switching functions as well as allocation of radio resources, call establishment and handover, completion of calls based on user-specified incoming call management contained in the service profile, etc. In other words, it controls the services and features available to the user based on the user's subscription and in conjunction with the user-specified terminal access configuration. It behaves like the MSC in the H.323 ITU-T specification entitled "Packet-Based Multimedia Communications Systems".

According to the present invention, an interworking means 18 is provided at a boundary 20 between the packet data network 12 and one or more circuit-switched networks 22, including at least one Public Land Mobile Network (PLMN) 24 for mediating call control messages between the Packet Data Network 12 and a Circuit Switched network 22. This could be a GSM, ANSI-41 or PDC mobile network, for instance. A GSM network is shown in FIG. 1. It includes a network switching subsystem 26 and a base station subsystem 28, as well as a plurality of mobile stations, one mobile station (MS) 30 of which is shown in FIG. 1. In GSM, it is possible to use a Subscriber Identity Module (SIM) 32 with which a user can provide his personal identification to the mobile phone and to the network. This provides authentication of the user and many other services including speed-dialing, storing abbreviated dialing numbers and messaging.

The base station subsystem 28 usually includes a plurality of base transceiver stations (BTS), one of which is shown in FIG. 1 with the reference numeral 34. It takes care of the radio-related tasks and provides connectivity between the network and the mobile station via an air interface (Um). A base station controller (BSC) 36 is connected to each BTS via an Abis interface, and it provides central functions as well as control of the BSS 28 itself.

An A-interface connects the base station subsystem 28 to the network-switching subsystem (NSS) 26, which includes a mobile switching center (MSC) 40, a visitor location register (VLR) 42, a home location register (HLR) 44, an authentication center (AuC) 46, an equipment identity register (EIR) 48, a short messaging services center (SMSC) 50, and a voice messaging system (VMS) 52. The MSC is like an ISDN exchange but modified to handle mobility issues, i.e., assignment of user channels toward the base station, handovers between MSCs, and various interworking functions. The Home Location Register (HLR) is a database that maintains information for the management of mobile subscribers. It contains the subscription information and may contain the location of each registered mobile station. The AuC is an authentication center, usually part of the HLR, that sends a random number to a user requesting a service which number is algorithmically combined with some secret information on the SIM to provide a thereby authenticated response. The VLR is also a database but unlike the HLR, which manages more static functions, it provides dynamic subscriber data management, particularly in connection with roaming. A Mobile Station (MS) roaming in an MSC area is assigned to a Visitor Location Register (VLR). A VLR is in charge of temporarily storing subscription data for the MSs registered in the MSC area. A VLR may be collocated with an MSC and may be in charge of one or several MSC areas. These procedures requires interrogating the home HLR of the called party identified by an MSISDN to obtain the E.164 or URL address of the Visited MSC (VMSC) currently serving the subscriber. In the case of incoming calls to the PLMN, if the delivering network(s) is unable to interrogate the HLR, the call is routed to an MSC. This MSC will interrogate the appropriate HLR and then route the call to the MSC where the mobile station is located. The MSC which performs the interrogation and routing function to the actual location of the mobile is called the Gateway MSC (GMSC). The EIR, if installed, contains lists of approved types of mobile equipment, barred (e.g. stolen) mobile equipment, and equipment to be traced. The network switching subsystem 26 may be interconnected with the base station subsystem 28 by means of an operational support system (OSS) 54, which provides operation and maintenance. The PLMN 24 may also be connected to a public-switched data network 54, another PLMN 56, a public switched telephone network (PSTN) 58, and an ISDN network 60, among others.

The 3GPP architecture should also support Mobility Management in a general manner. The entity that handles this procedure within the 3GPP scope is the Call and Mobility Signaling (CMS). The main concepts to be considered are basically the authentication of both the user and the terminal. Then, it will be necessary to authorize the service profile attached to that user. That information will reside initially on the Home Subscriber Server (HSS) 70 and the specific profile will be shared between the HLF and VLF or local SIP proxy according to the user needs. Additionally, extra interworking features are needed for achieving a complete interoperability between the different technologies. The Call State Control Function as part of the Call processing Server (CPS) should manage the mapping between the HLF (H.323), the Proxy Registrar (SIP) and HLR of the PLMN.

According to the present invention, signaling is provided by the terminal 10 on the radio link 14 according to an application-layer protocol to a call control interface such as the interworking interface 18 between the packet data network 12 and the circuit-switched network 22, such as the PLMN 24. It should be realized that although the interworking interface 18 is described herein as performing the inventive interworking function, the function is not necessarily performed in the PLM/UMTS interworking (R-SGW) block 18 of FIG. 1. It could be performed elsewhere such as in the HSS 70 block or the S-CSCF block 16, or in any other convenient functional block. The invention is therefore not limited to a specific embodiment shown herein which is merely illustrative of one way of carrying out the invention. The signaling on the line 14 from the terminal 10 is received by the CSCF 16 and forwarded on a line 62 to the interface 18. The interface 18 is for converting the signaling from the terminal 10 for providing signaling on a line 64 in a protocol used in the circuit-switched network 22 for enabling the terminal 10 to access one or more services of the circuit-switched network. The converted signaling on the line 64 may be provided directly to the circuit-switched network, such as the PLMN 24 or may instead be provided through an STP (Signal Transfer Point) 66, which in turn provides the signaling on a line 68 to the MSC 40.

Likewise, in the reverse direction, signaling peculiar to the protocol used in the circuit-switched network is provided on the line 68 back through the STP 66 on the line 64 (or directly) to the interface 18 for conversion in the opposite manner back to the particular application-layer protocol form of signaling for transfer back on the line 62 through the CSCF 16 on the radio link 14 to the terminal 10. In this way, a communications setup procedure can be effected back and forth between the terminal 10 and the PLMN 24. For instance, the mobility features used in the PLMN which utilize the HLR 44, among others, can be usefully utilized by the terminal 10 in conjunction with a Home Subscriber Server (HSS) 70 of the packet data network 12.

The transfer of information between the terminal 10 and the PLMN 24 would then take place for example via the packet network GGSN (3G-Gateway GPRS Support Node) and a media gateway 74 via either the PSTN 58 or the ISDN 60. Because the AMR codec to be used in a proposed 3G terminal 10 is not supported by most terminals of circuit switched networks 22, interworking is also required for the user plane. The gateway 74, for instance, can perform transcoding between AMR and G.711 codecs. Naturally, interworking is required also for mediating between circuit switched transport and IP transport at both the control and user planes.

It will therefore be understood the interface 18 is responsive to signaling provided by the application-layer control protocol from the terminal 10 of the packet data network 12 and converts the signaling from the terminal for providing signaling in a protocol used in the circuit-switched network 22 for enabling the terminal 10 to access one or more services of the circuit-switched network. If the terminal 10 is to take advantage, for instance, of the roaming capabilities of the PLMN 24, the signaling from the terminal 10 is indicative of a private user identification of the terminal/user for enabling access to a roaming service available in the circuit-switched network comprising, at least in part, the PLMN 24. The application-layer control protocol could, for instance, be a session initiation protocol (SIP) known from the Internet Engineering Task Force (IETF) RFC 2543. The SIP is an application-layer control (signaling) protocol for creating, modifying and terminating sessions with one or more participants. According to RFC 2543, the sessions include internet multimedia conferences, internet telephone calls and multimedia distribution. Importantly for the purposes of the present invention, SIP is designed to be independent of the lower-layer transport protocol and can be extended with additional capabilities. Such an additional capability, according to one way to carry out the present invention, is to provide a session description protocol (SDP) within the SIP to indicate a private user identification of the terminal/user for enabling access to a service of the circuit-switched network, such as the PLMN 24 for use by the terminal of the packet data network. Roaming is such a service which can be advantageously accessed in this way. The SDP is known from RFC 2327.

Figure 2:
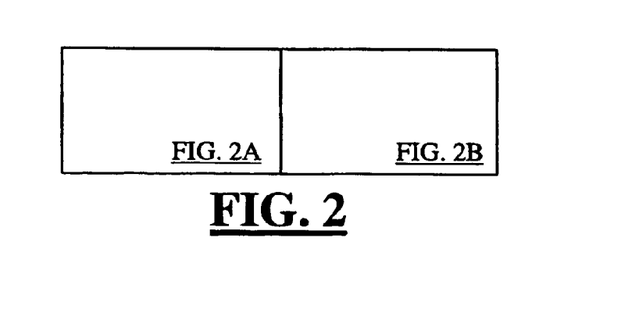
FIG. 2 shows how FIGS. 2A and 2B fit together.
Figure 2A:
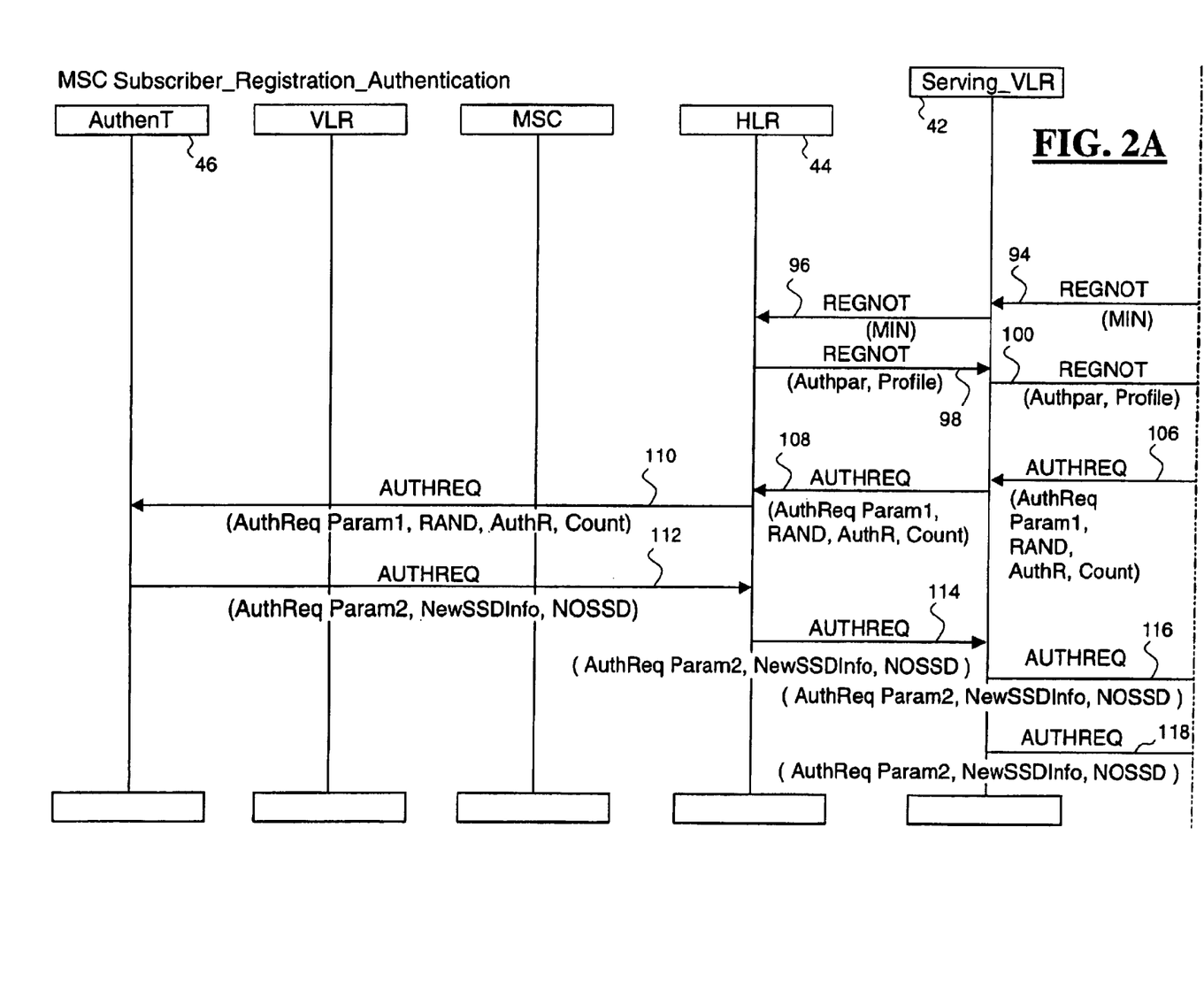
FIGS. 2A and 2B together illustrate a setup procedure between a mobile terminal of the packet data network and a public land mobile network using the interface of FIG. 1.
Figure 2B:
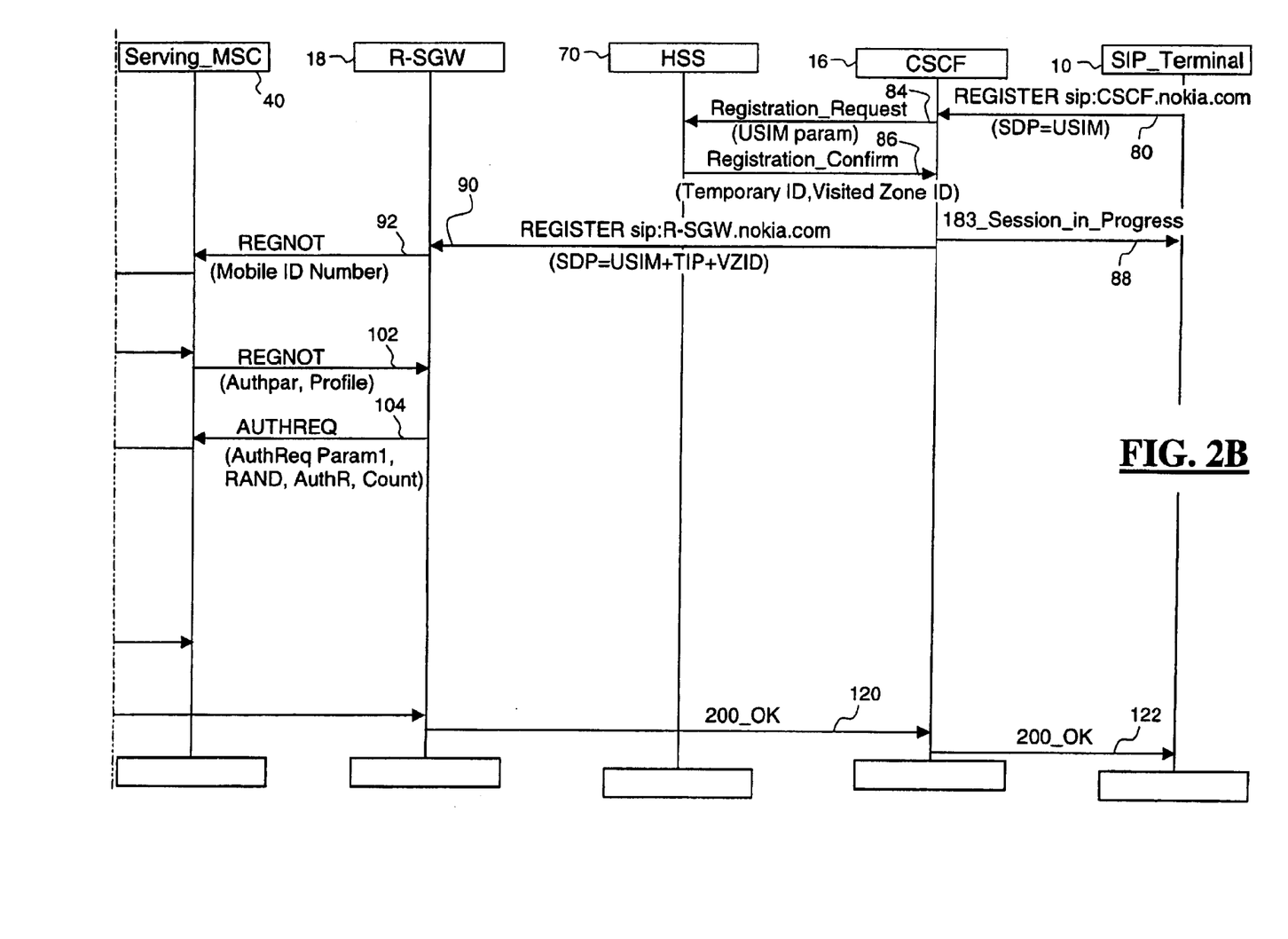

As shown in FIGS. 2A and 2B, for example, a communications setup is shown which has been initiated by the terminal 10 of the packet data network 12 of FIG. 1 which may be enabled to utilize an application-layer control protocol such as SIP. As known from the SIP RFC 2543 at Sec. 4.2.6 thereof, a client uses the REGISTER method to register the address listed in a "To" header field with an SIP server intermediate the CSCF 16 and the terminal 10, or built in to the CSCF itself. Although a separate proxy register is not shown in FIGS. 2A and 2B, this could be used and accessed by the SIP terminal 10 with an encrypted mobile user identity and system identity multicasting or using DHCP for discovering the SIP proxy registrar by means of a register request. A not shown user agent (UA) would then send the register request to the CSFC 16 of FIGS. 1 and 2B. The register request may contain an authorization field (e.g., after a 401 authentication required response) and the SDP message in the body of the message with the user information (USIM). This is indicated on a line 80 in FIG. 2B. The CSCF 16 (if equipped with SIP proxy/register capabilities) will respond with 100 Trying (not shown) indicating that it is trying the registration.

The CSCF 16 provides the user information in a registration request signal on a line 82 to the HSS (signaling interface (x)) 70 of FIG. 2B, as indicated by a line 84 in FIG. 2B. In this way, the USIM parameter is transmitted to the HSS. The HSS then confirms registration request back to the CSCF on the line 82 of FIG. 1, as indicated by a line 86 in FIG. 2B. The registration request confirmation includes a temporary ID and visited zone ID, indicative of the zone in which the terminal 10 is currently located within the packet data network 12. The CSCF then sends a session-in-progress signal back to the terminal 10 over the radio link 14, as indicated by a signal on a line 88 in FIG. 2B.

The CSCF 16 then sends the register request previously received from the terminal 10 on the line 80 onward to the interworking interface 18 of FIG. 1, as indicated by a signal on a line 90 in FIG. 2B, which may include a session description in the SDP format within an application-layer control protocol, such as SIP, as shown.

The CSCF 16 is the main call control element of the packet data network 12. The CSCF 16 provides call control service to the subscriber by accepting and processing the registration request of the subscriber and handling call setup and termination. For mobile-terminated calls, CSCF queries the location of the subscriber through the HSS 70 functionality.

It should be mentioned that the CSCF also has to handle the mapping between the AuF (H.323), the remote Proxy (SIP) Authentication, and in the context of the present invention, the AuC 46 of the PLMN 24. It provides authentication of the user identification and maintains user location information in the service profile. It also includes the mapping between the VLF (H.323), the remote Proxy Registrar (SIP), and the VLR 42 of the PLMN 24. It provides translation between the user identification and the identification of the terminal currently associated with the user for the completion of calls to the user's current location. Basically, it controls the services and features available to the user based on the user3 s subscription and in conjunction with the user-specified terminal access configurations.

In summary, the CSCF behaves like the Mobile Switching Center (MSC) in H.323 nomenclature. In both cases, the MSC/CSCF performs all the switching functions for mobile stations. This includes the allocation of radio resources, call establishment and handover. It controls the completion of calls based on user-specified incoming call management contained in the service profile. The role of CSCF is managed by a not shown SIP proxy, which will handle the calls from all the Mobiles Stations under its scope.

As mentioned earlier, and more pertaining to the present invention, the interworking interface 18 or some other entity has the task of converting the register request on the line 84 of FIG. 2B to a control protocol used in the circuit-switched network, such as the PLMN 24 of FIG. 1. Such a protocol for PLMN includes the signaling shown to the left of the R-SGW interface 18 of FIG. 2B. FIGS. 2A and 2B also show some further details of the PLMN 24 including the possibility that the MSC 40 accessed by the mobile station 30 is not a gateway MSC, but is rather an MSC of the type that is not directly connectable to other networks (such as the PSTN 58 and the ISDN 60 of FIG. 1).

It should be realized that the foregoing is also applicable to enable current GSM Mobile Subscribers to access UMTS mobile networks using an SIP terminal and obtain the same Mobile Services they get from a PLMN mobile station or even new services. Furthermore, the scope of this invention is to specify such Inter-Working between $2^{nd}$ Generation PLMNs, H.323 and SIP networks. This approach includes the mapping of PLMN Mobile Application Part (MAP) and H.323 elements with SIP messages. This does not require any changes in the Mobile Networks or SIP messages. As described above, the scope of this invention is also to specify how User Identification Information may be used in an SIP Terminal, in order for an SIP terminal to appear as a PLMN terminal on the PLMN network. Thus, backward interoperability with both PLMN networks and H.323 terminals is guaranteed.

As pointed out above, the present invention can be carried out by defining an extension of session attributes in the SDP protocol (RFC 2327) within an SIP message and the pertinent procedures to allow the support of User Identification Information for various PLMN mobile networks. The invention does not require any changes in either the Public Land Mobile Networks or in the actual SIP syntax.

It should be mentioned that if the 3G terminal 10 (SIP based) does not have User Identification Information, the following principles will apply:

The SIP mobile terminal 10 without User Identification Information is a regular SIP terminal. Calls from a regular SIP terminal to phone numbers on PLMN or PSTN will be addressed through an associated SIP Gateway. They will be treated as a regular SIP call in the packet data network.

Calls from the circuit switched side 22, such as from PLMN 24 cannot be delivered to a normal SIP terminal unless an association of mobile phone number with the regular SIP terminal exists. Thus, that SIP terminal should be registered with the normal SIP URL plus the extra information required for being reached from a PLMN terminal. The information should contain data for providing billing capability, operation administration and management capability.

It will therefore be realized that the User Identification Information allows the SIP terminal to provide the required subscriber identity to register with the PLMN and gain access to services to obtain a Subscription transparency across networks. Note that these identifications should be harmonized with the proposed Universal subscriber Identity Module in $3^{rd}$ Generation wireless standards groups. See for example 3G TS 31.102 "Characteristics of the USIM Application" and related specifications.

The basic model of the present invention is a logical interworking function that performs the appropriate protocol conversion, database mapping and transaction management to support the Mobility Management, Call Origination, and Call Delivery functions using already defined SIP headers within the SDP body.

The description of FIGS. 2A and 2B below continues the description of the interaction between an H.323 network, a PLMN network and a 3GPP network. Operations and messages that are mapped between the Roaming Signalling Gateway (R-SGW) and serving Mobile Switching Center (MSC), Visitor Location Register (VLR) and eventually the H.323 Gatekeeper for a call initiated in the Packet Data Network 12.

The Inter-working functions are as follows:

Mobility Management Message Flows Registration and Authentication of SIP Terminal Authentication of the SIP terminal user Communication Management message flows Call Origination from SIP terminal to PLMN Call Termination to SIP terminal from PLMN Message Waiting Notification delivery to SIP terminal Short Message Origination from Short Message Entity in SIP terminal Short Message Termination to Short Message Entity in SIP terminal Referring back to FIGS. 2A and 2B, the message flows illustrate User Mobility and Service Mobility concepts for users between H.323 networks, PLMN and 3GPP networks.

The first steps involve the Registration and Authentication of the SIP Terminal and the utilization of the SDP packet for providing User Identification Information within the Registration. The syntax of the SIP REGISTER message is illustrated by the following example:

EXAMPLE

UA->CSCF:
REGISTER sip: Request-URI SIP/2.0
Via: SIP/2.0/UDP IP address
From: sip: public address[user@domain] [E.164 address@CSCFdomain; user=phone]
To: sip: public address[user@domain] [E.164 address@CSCFdomain; user=phone]
Call-ID: local-ID@host
CSeq: 1 REGISTER

```
Contact: <sip:user@IP address:port; transport=udp/tcp>
Authorization: UMTS<RES value in HEX format>
Content-Length:X
Expires: delta-seconds
Content-type: application/sdp
v=0
i="information of this session"
a=imsi:2345122434
a=msisdn:358951162209
``` a) The SIP Terminal 10 with Encrypted Mobile User Identity & System Identity multicasts (or uses DHCP for discovering the SIP nearest Proxy Registrar) a REGISTRAR Request. The not shown UA sends the REGISTER request on the line 80 to the CSCF. The REGISTER request may contain an Authorization field (e.g. it is after a 401 Authentication Required response) and the SDP message in the body of the message with the User Information (USIM) as shown below.

Figure 3:
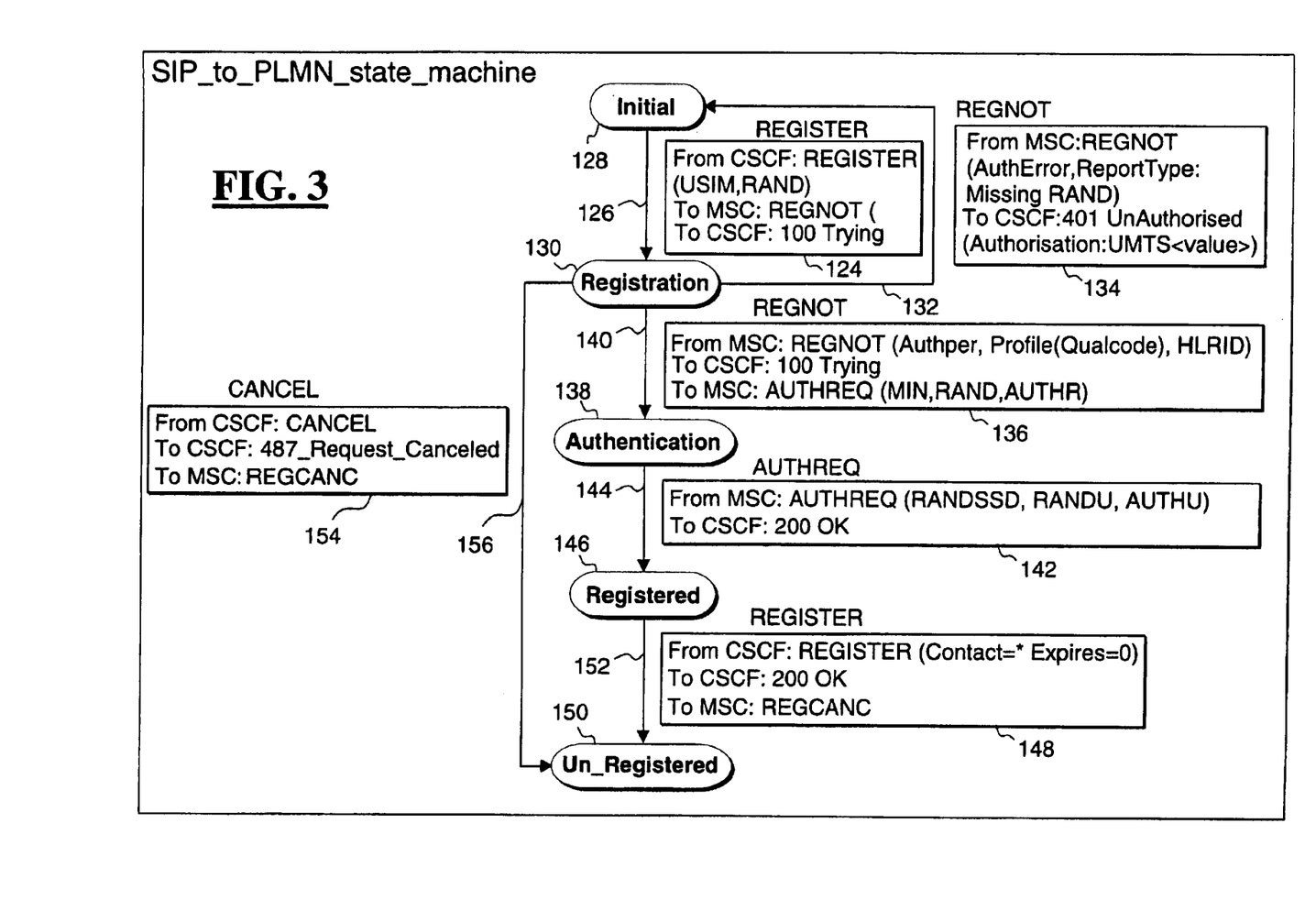
FIG. 3 shows a state machine interworking from the packet data network to the circuit switched network of FIG. 1.

```
REGISTER sip: i-cscsf.nokia.com SIP/2.0
Via: SIP/2.0/UDP i-cscf.nokia.com
From: sip: +358951162209@CSCFdomain; user=phone
To: sip: +3589511634554@CSCFdomain; user=phone
Call-ID: my_host@host
CSeq: 1 REGISTER
Contact: <sip:joe@nokia.com:5060; transport=udp>
Authorization: UMTS <RES value in HEX format>
Content-Length:X
Expires: delta-seconds
Content-type: application/sdp
&
************************************************
*     ENCRYPTED       *
*v=0&                 *
*i= "information of this session"&  *
*k=Kc ciphering key            *
*a=imsi:2345122434&    * (for GSM networks)
*a=msisdn:354563355209&  * (for GSM networks)
*a=min:355643355609&   * (for ANSI-41 networks)
*a=esn:358345633509&   * (for ANSI-41 networks)
*k=Ciphering key for GPRS      *
************************************************
``` b) The CSCF 16 (with SIP Proxy/Registrar capabilities) will respond with 100 TRYING (not shown) indicating that it is trying the registration. The CSCF sends the User Information on the line 84 to the HSS 70 (Signalling Interface Cx) and on the line 90 to the R-SGW (Interface Ms) where it converts all the SIP Terminal information to appropriate PLMN information in order to start transactions to PLMN as the Serving MSC and Serving VLR. The HSS will provide the information needed for accessing the MSC based on the data within the REGISTER message. The HSS will analyze the received imsi and msisdn and will translate to the appropriate identifiers needed for the local MSC. FIG. 3 shows a state machine which may be present in the R-SGW 18 or in another functional block elsewhere in FIG. 1. The state machine covers the case where a call is initiated from the packet data network 12 side directed to the circuit switched network 22 side. A state machine for the opposite direction will be described later. In any event, referring to FIG. 3, the above mentioned 100 TRYING message is shown by a register request 124 illustrating a transition 126 from an initial state 128 to a registration state 130. The transition 126 is caused by the signal on the line 90 of FIG. 2B, for instance. If the interworking function is not carried out in the R-SGW 18 of FIG. 1, but is carried out for instance in the HSS 70, then the state machine of FIG. 3 would be resident in the HSS 70 and the transition on the line 126 would be caused by the signal on the line 84 from the CSCF 16 to the HSS 70. For purposes of the present invention, it is not particularly important where the state machine resides or where the interworking function is carried out, whether centrally or in a distributed manner. For purposes of clarity, these functions are shown carried out in the R-SGW 18 but it will be clearly understood that the various functions are transferable. If there is an authorization error or the like, a transition 132 is made back to the initial state 128 accompanied by a REGNOT message 134, as shown. After leaving the initial state 128 and entering the registration state 130 or subsequent states, the CSCF 16 can take further steps to reserve required media resources from the gateway 74, e.g., for RTP stream termination by sending an Add End Point (EP) message. This media gateway control functionality in the CSCF can also reserve required resources from the gateway 74 for the circuit switch network connection by sending an appropriate Add End Point message as well.

c) Once in the Registration State 130, the Roaming Signalling Gateway (R-SGW) Inter-working function 18 sends a REGNOT (Registration Notification) message on a line 92 to a Serving MSC 40 within the CSCF area. This approach is for providing total interoperability with the actual PLMN networks, despite the fact that this approach could be improved upon later by contacting the origin HLR directly. As indicated in FIG. 3, by sending the REGNOT message 136, the state machine transitions from the registration state 130 to an authentication state 138 as indicated by a transition line d) The Serving MSC determines that a roaming SIP Terminal is within its service area; the Serving MSC may detect the SIP Terminal presence through autonomous registration, call origination, call termination or a service order. The Serving MSC sends a REGNOT on a line 94 to its VLR 42 with following information as defined in the ANSI-41 or GSM PLMN specifications.

e) The Serving VLR 42 determines that either (a) the SIP Terminal had previously registered with an MSC within the domain of the VLR but the Terminal has been reported inactive by the VLR, (b) the Terminal is not known to the VLR, or (c) the requested information cannot be made available for the indicated Terminal. Under these conditions, the Serving VLR 42 forwards the REGNOT on a line 96 to the HLR 44 associated with the Terminal.

f) The HLR 44 determines that authorization can be granted to the Terminal. It returns the requested information to the Serving VLR 42 in the REGNOT on a line 98.

g) The VLR 42 forwards the REGNOT on a line 100 to the Serving MSC 40.

h) The serving MSC 40 in turn forwards the REGNOT with subscriber profile information on a line 102 to the R-SGW that will contact the CSCF for sending a (not shown) 180 Trying message that will be forwarded to the Terminal 10. It will indicate that the Registration is being processed. The CSCF will provide the Ciphering key that was also included in the SDP message.

i) On this initial access attempt by an authentication-capable Terminal 10, the R-SGW 18 sends the key within an AUTHREQ on a line 104 to the serving MSC 40.

j) The serving MSC 40 sends the AUTHREQ to the serving VLR 42 on a line 106 with all parameters mentioned in the above state.

k) The VLR 42 sends the AUTHREQ on a line 108 to the HLR 44 associated with the Terminal 10.

l) The HLR 44 forwards the AUTHREQ on a line 110 to the Authentication server (AuC) 46 with the same parameters.

m) The AuC 46 determines that the Terminal 10 should be allowed access. The AC sends an AUTHREQ on a line 112 to the HLR 44.

n) The HLR 44 forwards the authreq on a line 114 to the Serving VLR 42.

o) The Serving VLR 42 forwards the authreq on a line 116 to the Serving MSC 40. In this state are included the SSD (Shared Secret Data), AAV and NOSSD parameters.

p) The Serving MSC 40 (VLR 42) sends an AUTHREQ message 142 on a line 118 to R-SGW 18 to allow completion of authentication of the Terminal. As shown by a transition line 144 in FIG. 3, the AUTHREQ message 142 causes a transition from the authentication state 138 to a registered state 146 in the state machine of FIG. 3.

q) After the authentication succeeds the R-SGW 18 will send a 200 OK on a line 120 after the authentication succeeds to the CSCF 16. The CSCF 16 will forward the message on a line 122 to the Terminal 10, which after this step is ready to access Mobile Services from all preferred Service Providers in the PLMN via the Gateway 74 using e.g. RTP streams established between the Gateway 74 and the 3G terminal 10 and e.g. T1/E1 speech time slots between the Gateway 74 and the PSTN 58. The Gateway 74 performs the transcoding.

r) The state machine of FIG. 3 will remain in the registered state 146 until the R-SGW 18 is informed by a register message 148 from the CSCF 16 to cancel the registration and a transition is then made to an unregistered state 150 as indicated by a transition line 152. A transition can be made to the unregistered state also by way of the registration state 130 upon receipt of a cancellation message 154 from the CSCF 16 during the authentication process. Such is indicated by a transition line 156. A transition from the unregistered state 150 back to the initial state 128 can be initiated upon another invite message from the 3G terminal 10 or from another internet multimedia terminal.

What follows is a description of Communication Management message flows for a case in which the Terminal is trying to make the registration based on a PIN.

a) Discover the local CSCF in a manner similar to that described above during the Registration process.

b) Registration and Authentication of the Terminal is similar to the scenario described above.

c) The Terminal sends a REGISTER message to the CSCF including the Mobile User Identity & System Identity in the SDP part of the packet. It is sent to the HSS and then it is forwarded to the R-SGW.

d) The R-SGW analyses the SDP packet, which contains the USIM information that was updated by the HSS and sends a PLMN operation FeatureRequest with Dialed Digits to initiate subscriber authentication on PLMN.

e) The serving MSC sends the FEATREQ to the HLR associated with the Terminal Subscriber. The TransactionCapability parameter is also included in the FEATREQ, indicating that the Serving MSC supports receiving RUIDIRs.

f) The HLR recognizes the dialed digits as a feature registration with a forward-to or diversion termination address that matches a Subscriber Personal Identification Number Intercept (SPINI) Trigger. The HLR send a RUIDIR to the Serving MSC.

g) On receipt of the RUIDIR, the Serving MSC turns off the FEATREQ timer (FRRT) and forwards the FEATREQ message to the R-SGW in order to provides call treatment as indicated in the received message. In this case, the treatment is to answer the call (i.e., connect the calling party to the subsystem capable of user interaction), and prompt the user based on the information in the received RUIDIR (in the DigitCollectionControl parameter) and wait for digits.

h) The R-SGW sends the 100 TRYING message to the CSCF which forwards it to the Terminal.

i) The R-SGW sends the 180 RINGING message to the CSCF which forwards it to the Terminal j) The R-SGW now sends the Authentication Required message to the CSCF which forwards it to the Terminal k) The Terminal sends the ACK to the CSCF and R-SGW are in Talk State with RTP media, The Terminal prompts the user for PIN.

l) The user responds with the authentication PIN, which is sent in Information (collected digits) from Terminal to the CSCF.

m) The R-SGW takes the collected digits and sends it to the Serving MSC function in ruidir operation.

n) The Serving MSC sends a ruidir to the HLR and includes the digits dialed by the user. The Serving MSC restarts the FRRT Timer.

o) The HLR updates the served MS's feature registration information and sends a featreq including the FeatureResult parameter indicating successful feature operation to the Serving MSC.

p) The Serving MSC turns off the FEATREQ timer (FRRT) and provides treatment to the served Terminal as indicated in the received featreq. In this case, the treatment is to provide feature confirmation and release the call.

q) The R_SGW updates the subscriber confirmed profile and sends the 200 OK message to the Terminal meaning that the Authentication has succeed.

r) The Terminal subscriber is now ready to use Mobile Services until deregistration of the Terminal and user.

Figure 4:
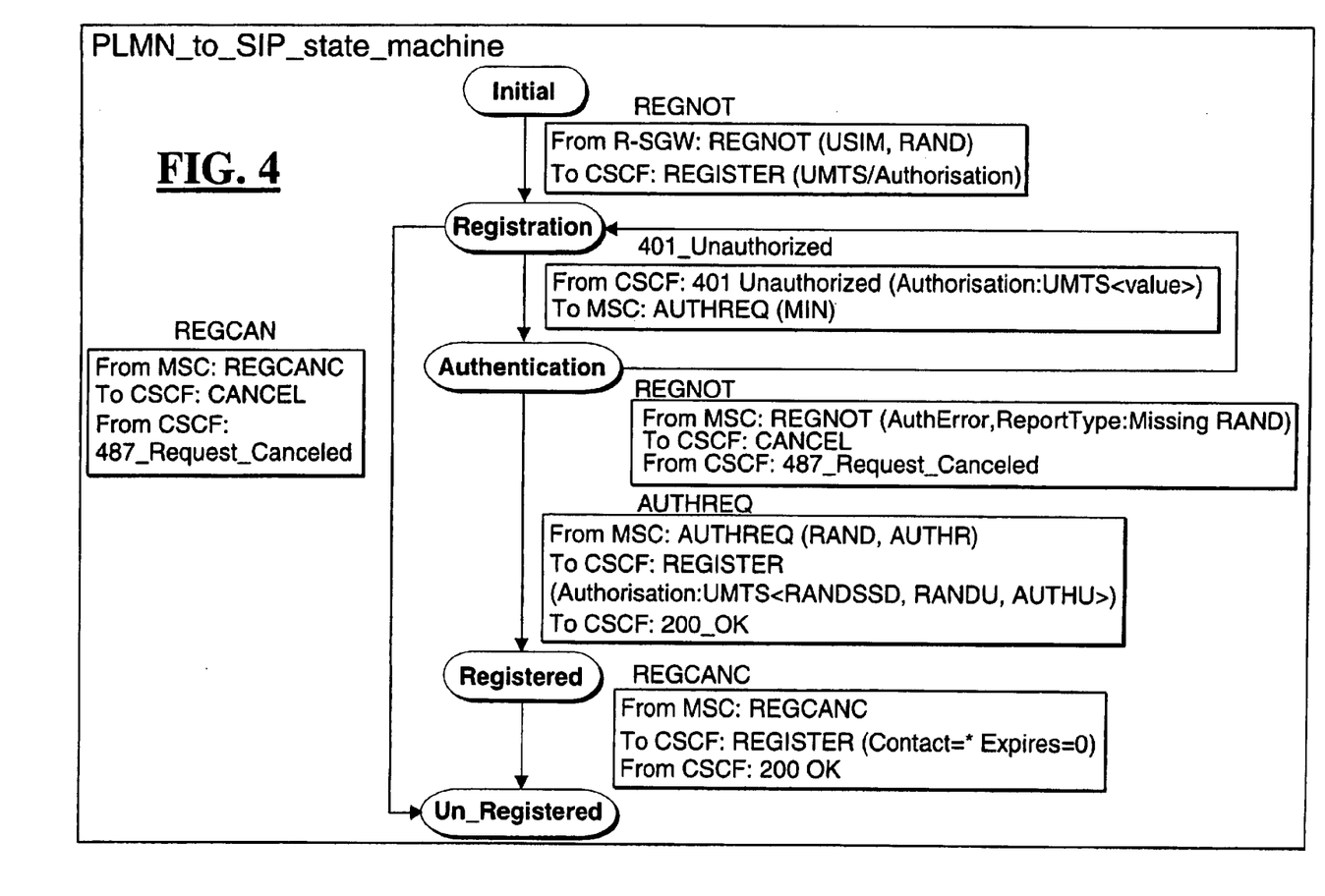
FIG. 4 shows a state machine for interworking from the circuit switched network to the packet data network of FIG. 1.

Referring now to FIG. 4, a state machine is shown for use in the R-SGW 18 of FIG. 1 or elsewhere within FIG. 1 for interworking control messages between the circuit switched network 22 and the packet data network 12 where the call is initiated from the circuit switched network 22 side. A user initiates a call from the circuit switched network 22 side and messages are exchanged in a manner similar to that shown in FIGS. 2A and 2B except in the reverse direction wherein the state machine of FIG. 4 is self-explanatory.

Figure 5:
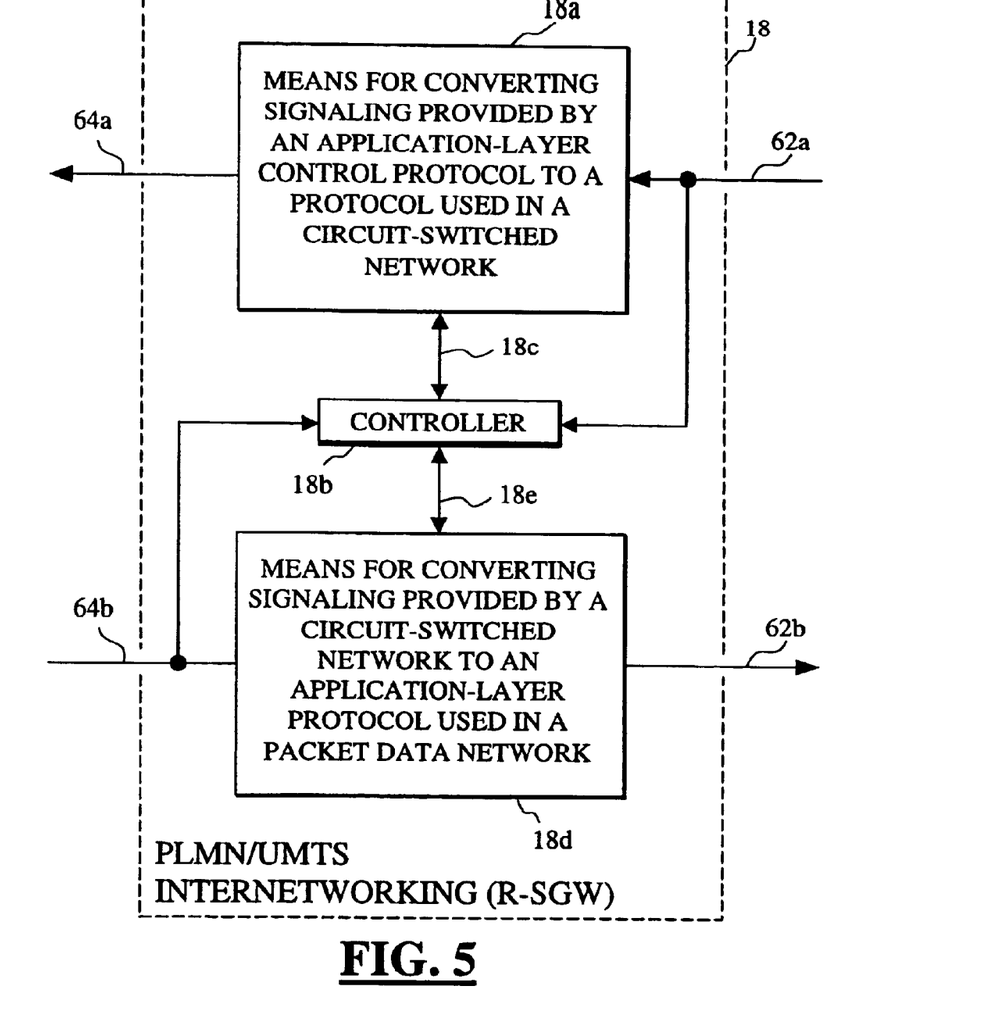
FIG. 5 shows the interface of FIG. 1 in more detail.

Referring now to FIG. 5, the interface 18 of FIG. 1 is shown in more detail. It includes means 18a for converting signaling on a line 62a provided by the application-layer control protocol from the terminal 10 of FIG. 1 via the S-CSCF 16 and the air interface 14. A controller 18b is also responsive to the signaling on the line 62a for providing control signals on a line 18c for controlling the means 18a for converting the signaling on the line 62a to signalling on a line 64a. This conversion process may be carried out in conjunction with the state machine of FIG. 3, for example, and converts the application-layer control protocol signaling on the line 62a to a protocol on the line 64a that is used in the circuit-switched network 24 of FIG. 1. As explained above, this enables the terminal 10 to access one or more services of the circuit-switched network. The interface 18 also includes means 18d responsive to signaling on a line 64b provided by the circuit-switched network (in the protocol used in the circuit-switched network) for converting the signaling on the line 64b to signaling on a line 62b for the application-layer control protocol used in the terminal 10 of the packet data network of FIG. 1. This process is carried out in conjunction with the state diagram of FIG. 4. This also enables the terminal to access one or more services of the circuit-switched network by allowing signaling for completing the setup in the reverse direction. The controller 18b is also responsive to the signal on the line 64b for providing and receiving control signals on a line 18e to and from the means 18d for the purpose of converting the signaling on the line 64b to the signaling on the line 62b.

Figure 6:
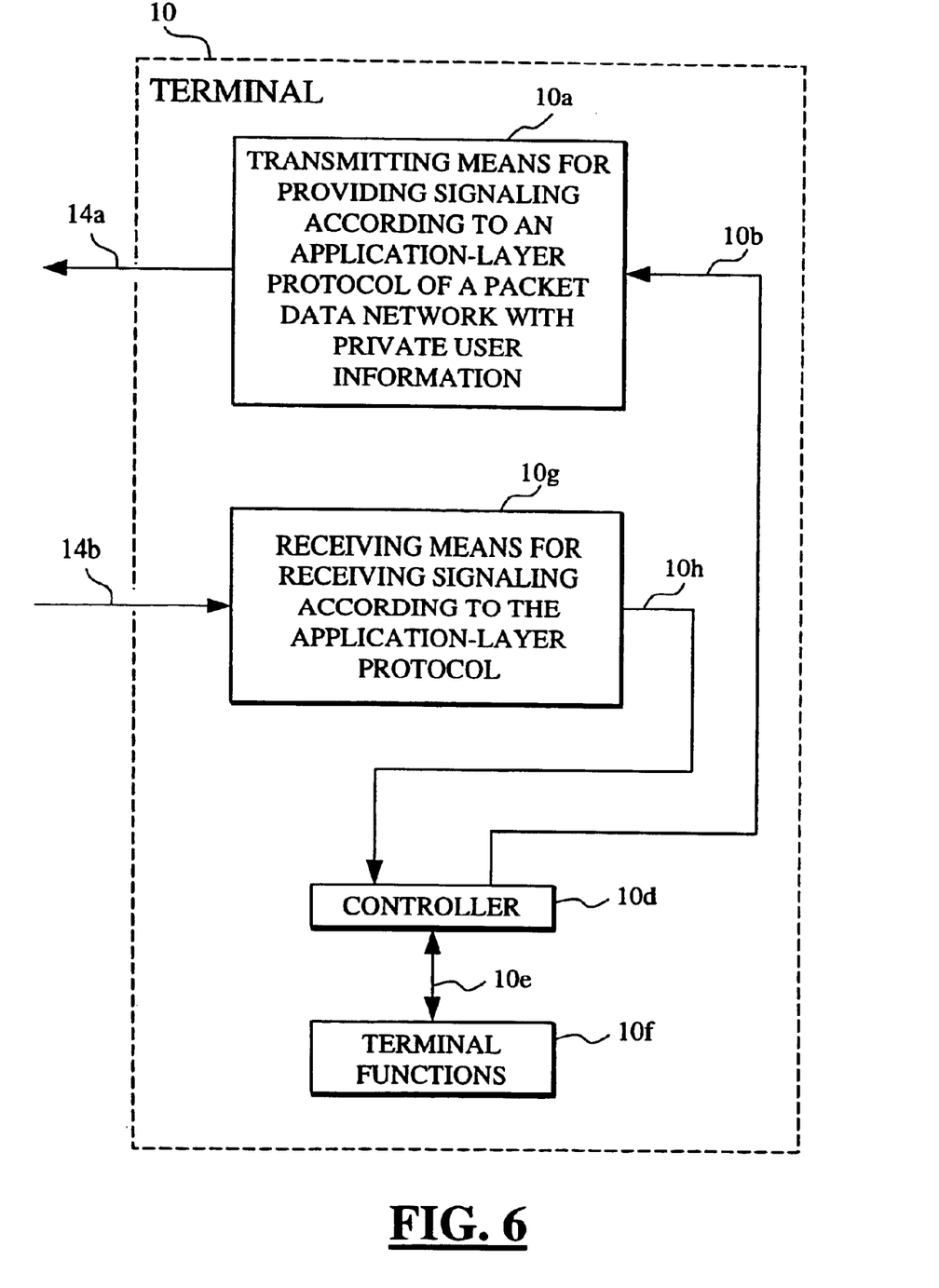
FIG. 6 shows the mobile terminal of the packet data network of FIG. 1 in more detail.

Referring now to FIG. 6, the terminal 10 of FIG. 1 is shown in more detail. It includes transmitting means 10a responsive to a signal on a line 10b from a controller 10d for providing signaling on a line 14a according to the application-layer protocol of the packet data network 12 of FIG. 1 for setting up a communication link between the terminal 10 and a service of the PLMN 24 of FIG. 1. The controller 10d is in communication over control, data and addressing lines 10e with terminal functions 10f resident in the terminal 10. The terminal 10 also includes receiving means 10g responsive to signaling from the interface 18 of FIG. 1 via the S-CSCF 16 and over the air interface 14 according to the application-layer control protocol of the packet data network 12 of FIG. 1. This signaling received from the interface 18 is also indicative of a communication setup between the terminal 10 and the circuit-switched network 24 of FIG. 1, wherein the terminal 10 is to access one or more services of the circuit-switched It should be realized network. A back-and-forth signaling sequence such as shown in FIGS. 2A and 2B takes place between the terminal 10 and the circuit-switched network 24 in order to completely set up the communication link between the terminal and a component of the circuit-switched network. Once the communication is set up, communication can commence with a transfer of voice, data or both. The receiving means 10g provides the application-layer signaling on the line 10h to the controller 10d, which in turn communicates with the terminal functions 10f over the lines 10e.

What is claimed is:

1. Method, comprising the steps of:
receiving registration signaling provided by an application-layer control protocol from a terminal of a packet data network at an interface between the packet data network and a circuit-switched network, and
converting the registration signaling from the terminal at the interface, for providing registration signaling in a protocol used in the circuit-switched network for enabling the terminal to access one or more services of the circuit-switched network as a registered terminal of the circuit-switched network.

2. The method of claim 1, wherein the signaling from the terminal is indicative of a private user identification of the terminal for enabling access to a roaming service available in the circuit-switched network comprising, at least in part, a public land mobile network (PLMN).

3. The method of claim 1, wherein the application-layer control protocol is a session initiation protocol (SIP) and the circuit-switched network comprises, at least in part, a public land mobile network (PLMN).

4. The method of claim 3, wherein said step of receiving includes the step of receiving a session description protocol (SDP) within the SIP to indicate a private user identification of the terminal for enabling access to a roaming service of the PLMN for use by the terminal of the packet data network.

5. The method of claim 1, wherein said step of receiving includes the step of receiving a session description protocol (SDP) within the application-layer control protocol to indicate a private user identification of the terminal for enabling access to a roaming service available in the circuit-switched network comprising, at least in part, a public land mobile network (PLMN) for use by the terminal of the packet data network.

6. Method, comprising the steps of:
providing registration signaling according to an application-layer protocol from a terminal of a packet data network to an interface between the packet data network and a circuit-switched network, wherein the interface is for converting the registration signaling from the terminal for providing registration signaling in a protocol used in the circuit-switched network for enabling the terminal to register as a terminal of the circuit-switched network and to access one or more services of the circuit-switched network as a registered terminal of the circuit-switched network, and
receiving signaling from the interface according to the application-layer control protocol at the terminal of the packet data network indicative of a registration of the terminal in the circuit-switched network.

7. The method of claim 6, wherein the signaling from the terminal is indicative of a private user identification of the terminal for enabling access to a roaming service available in the circuit-switched network comprising, at least in part, a public land mobile network (PLMN).

8. The method of claim 6, wherein the application-layer control protocol is a session initiation protocol (SIP) and the circuit-switched network comprises, at least in part, a public land mobile network (PLMN).

9. The method of claim 8, wherein said step of providing includes the step of providing a session description protocol (SDP) within the SIP to indicate a private user identification of the terminal for enabling access to a roaming service of the PLMN for use by the terminal of the packet data network.

10. The method of claim 6, wherein said step of providing includes the step of providing a session description protocol (SDP) within the application-layer control protocol to indicate a private user identification of the terminal for enabling access to a roaming service available in the circuit-switched network comprising, at least in part, a public land mobile network (PLMN) for use by the terminal of the packet data network.

11. Interface, comprising:
means for converting registration signaling provided by an application-layer control protocol from a terminal of a packet data network to a protocol used in a circuit-switched network for enabling the terminal to register as a terminal of the circuit-switched network and to access one or more services of the circuit-switched network as a registered terminal of the circuit-switched network; and
means for converting registration signaling provided by the circuit-switched network in the protocol used in the circuit-switched network to signaling for the application-layer control protocol used in the terminal of the packet data network for said enabling the terminal to access one or more services of the circuit-switched network.

12. The interface of claim 11, wherein the signaling from the terminal is indicative of a private user identification of the terminal for enabling access to a roaming service available in the circuit-switched network comprising, at least in part, a public land mobile network (PLMN).

13. The interface of claim 11, wherein the application-layer control protocol is a session initiation protocol (SIP) and the circuit-switched network comprises, at least in part, a public land mobile network (PLMN).

14. The interface of claim 13, wherein a session description protocol (SDP) is included within the SIP to indicate a private user identification of the terminal for enabling access to a roaming service of the PLMN for use by the terminal of the packet data network.

15. The interface of claim 11, wherein said signaling of the application-layer control protocol includes a session description protocol (SDP) to indicate a private user identification of the terminal for enabling access to a roaming service available in the circuit-switched network comprising, at least in part, a public land mobile network (PLMN) for use by the terminal of the packet data network.

16. Terminal of a packet data network, comprising:

transmitting means for providing registration signaling according to an application-layer protocol of the packet data network to an interface between the packet data network and a circuit-switched network, wherein the interface is for converting the registration, signaling from the transmitting means for providing registration signaling in a protocol used in the circuit-switched network for enabling the terminal of the packet data network to access one or more services of the circuit-switched network as a registered terminal of the circuit-switched network; and receiving means for receiving registration signaling from the interface according to the application-layer control protocol of the packet data network indicative of the terminal in the circuit-switched network for accessing said one or more services of the circuit-switched network.

17. The terminal of claim 16, wherein the signaling from the packet data network is indicative of a private user identification of the terminal for enabling access to a roaming service available in the circuit-switched network comprising, at least in part, a public land mobile network (PLMN).

18. The terminal of claim 16, wherein the application-layer control protocol is a session initiation protocol (SIP) and the circuit-switched network comprises, at least in part, a public land mobile network (PLMN).

19. The terminal of claim 18, wherein a session description protocol (SDP) is provided within the SIP to indicate a private user identification of the terminal for enabling access to a roaming service of the PLMN for use by the terminal of the packet data network.

20. The terminal of claim 16, wherein a session description protocol (SDP) is provided within the application-layer control protocol to indicate a private user identification of the terminal for enabling access to a roaming service available in the circuit-switched network comprising, at least in part, a public land mobile network (PLMN) for use by the terminal of the packet data network.

* * * * *